United States Patent [19]

Johnston et al.

[11] 4,278,220
[45] Jul. 14, 1981

[54] THRUST REVERSER FOR A LONG DUCT FAN ENGINE

[75] Inventors: Everett A. Johnston; Edward W. Ryan, both of Mason, Ohio

[73] Assignee: The United States of America as represented by the Administrator of the National Aeronautics and Space Administration, Washington, D.C.

[21] Appl. No.: 25,301

[22] Filed: Mar. 30, 1979

[51] Int. Cl.³ .......................... B64C 25/68; B64F 1/02
[52] U.S. Cl. ................................ 244/110 B; 60/226 A
[58] Field of Search ............... 244/110 B, 12.5, 23 D, 244/53 R, 54; 60/226 A, 229, 230; 239/265.29, 265.27, 265.31, 265.25

[56] References Cited

U.S. PATENT DOCUMENTS

| | | | |
|---|---|---|---|
| 3,262,268 | 7/1966 | Beavers | 60/226 A |
| 3,280,561 | 10/1966 | Kutney | 60/230 X |
| 3,347,467 | 10/1967 | Carl et al. | 239/265.31 |
| 3,511,055 | 5/1970 | Timms | 60/226 A X |
| 3,608,314 | 9/1971 | Colley | 60/226 A |
| 3,691,771 | 9/1972 | Colley | 60/226 A |
| 3,779,010 | 12/1973 | Chamay et al. | 60/226 A |
| 3,820,719 | 6/1974 | Clark | 60/226 A X |
| 4,030,291 | 6/1977 | Sargisson | 60/226 A |

*Primary Examiner*—Douglas C. Butler
*Attorney, Agent, or Firm*—Derek P. Lawrence; Dana F. Bigelow; Norman T. Musial

[57] ABSTRACT

A bypass duct outer cowl includes a fixed cascade disposed between axially spaced fixed cowl portions and a translatable cowl sleeve and blocker doors movably disposed on the respective radially outer and inner sides of the cascade. Actuation and linkage structure located entirely within the outer cowl provides for selectively moving the cowl sleeve rearwardly and rotating the blocker doors to a position across the bypass duct to cause the fan airflow to pass through the cascade in a thrust-reversing manner.

18 Claims, 8 Drawing Figures

THRUST REVERSER FOR A LONG DUCT FAN ENGINE

BACKGROUND OF THE INVENTION

The invention herein described was made in the performance of work under a NASA contract and is subject to the provisions of Section 305 of the National Aeronautics and Space Act of 1958, Public Law 85-568 (72 Stat. 435; 42 USC 2457).

This invention relates generally to gas turbine engines and, more particularly, to a thrust reverser for a turbofan engine.

It has long been common practice in the design of aircraft jet engines to provide some means of thrust reversal by deflecting or turning the exhaust gases from their normal rearward flowpath. Early thrust reversers were applied to the exhaust gas nozzles and were called "core thrust reversers." Later, with the advent of the turbofan engine, thrust reversers were applied to the bypass duct of the engine and have been referred to as "fan thrust reversers." Typically, thrust reverser mechanisms for jet engines have been in the form of so-called blocker doors which are circumferentially distributed and capable of being selectively pivoted so as to block off the rearward flow of gas and turn it radially outward. A further turning of the gas flow has been facilitated by the use of louvered structures, or cascades, mounted in the cowl in the vicinity of the blocker doors. Finally, in order to allow for the discharge of the airflow from the engine, provision was made for the opening of a portion of the outer cowl surface so as to expose the cascade structure and permit the free flow of the reversed flow air outside of the engine.

Since it has been necessary in the control functions of a turbofan engine to have a variable nozzle structure at the downstream end of the bypass duct, it has become common practice to incorporate the thrust reverser mechanism with that of the variable nozzle. Such an arrangement is shown in U.S. Pat. No. 3,779,010, issued on Dec. 18, 1973, and assigned to the assignee of the present invention. When the thrust reverser and nozzle functions are combined in this way, the resulting mechanism can be relatively complicated and may cause the sacrifice of desirable characteristics in one function for the sake of gaining advantages in the other. Thus, for this reason and others not so obvious, it may be desirable to provide separate and independent mechanisms for the thrust reverser and the variable area nozzle.

Another feature which is characteristic of present day nozzles, including the one shown in the patent mentioned hereinabove, is the use of links or rods which pass from the outer cowl to the inner cowl by way of the bypass duct. Such an arrangement is undesirable in that the links tend to interfere with the flow of air in the bypass duct.

Accordingly, it is an object of the present invention to provide an improved thrust reverser for the bypass duct of a turbofan engine.

Another object of the present invention is the provision for a fan engine thrust reverser which is independent from the variable area nozzle.

Yet another object of the present invention is the provision for a fan engine thrust reverser having no links which pass through the bypass duct.

Still another object of the present invention is the provision for a fan engine thrust reverser which is economical to manufacture, relatively simple in design, and effective in use.

These objects and other features and advantages become more readily apparent upon reference to the following description when taken in conjunction with the appended drawings.

SUMMARY OF THE INVENTION

Briefly, in accordance with one aspect of the invention, a cascade element is disposed between two axially spaced, fixed portions of the bypass outer cowl. A translatable cowl sleeve is disposed radially outward thereof, and is adapted to be moved axially rearward by an actuation system located entirely within the outer cowl. The blocker doors are movably placed on the radially inner side of the cascade element and are adapted to be rotated by linkage attached to the translatable cowl sleeve and a fixed cowl portion, to a position where they block the flow in the bypass duct and direct it outwardly through the cascade element. The blocker door linkage mechanism is also located entirely within the outer cowl.

By yet another aspect of the invention, the blocker doors are connected at their forward ends by a link pivotally attached to the forward end of the translatable cowl sleeve, and are connected at their rear ends by a link which is rotatably attached at its one end to the cowl rear fixed portion and rotatably and slidably connected at its other end to the blocker door.

By another aspect of the invention, a forwardly extending link is rotatably and slidably connected to the rear portion of the blocker doors and is moved by a connected unison ring when the translatable cowl sleeve reaches a predetermined axial position such that it engages the unison ring and pushes it rearwardly. Provision is also made for biasing the unison ring forwardly with respect to a part of the translatable cowl sleeve.

Another aspect of the invention provides for positive placement of the blocker doors by engagement of an attached roller in the track of the cascade element. This allows the forward end of the blocker doors to move rearwardly but remain in a generally radially outer position.

In the drawings as is hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
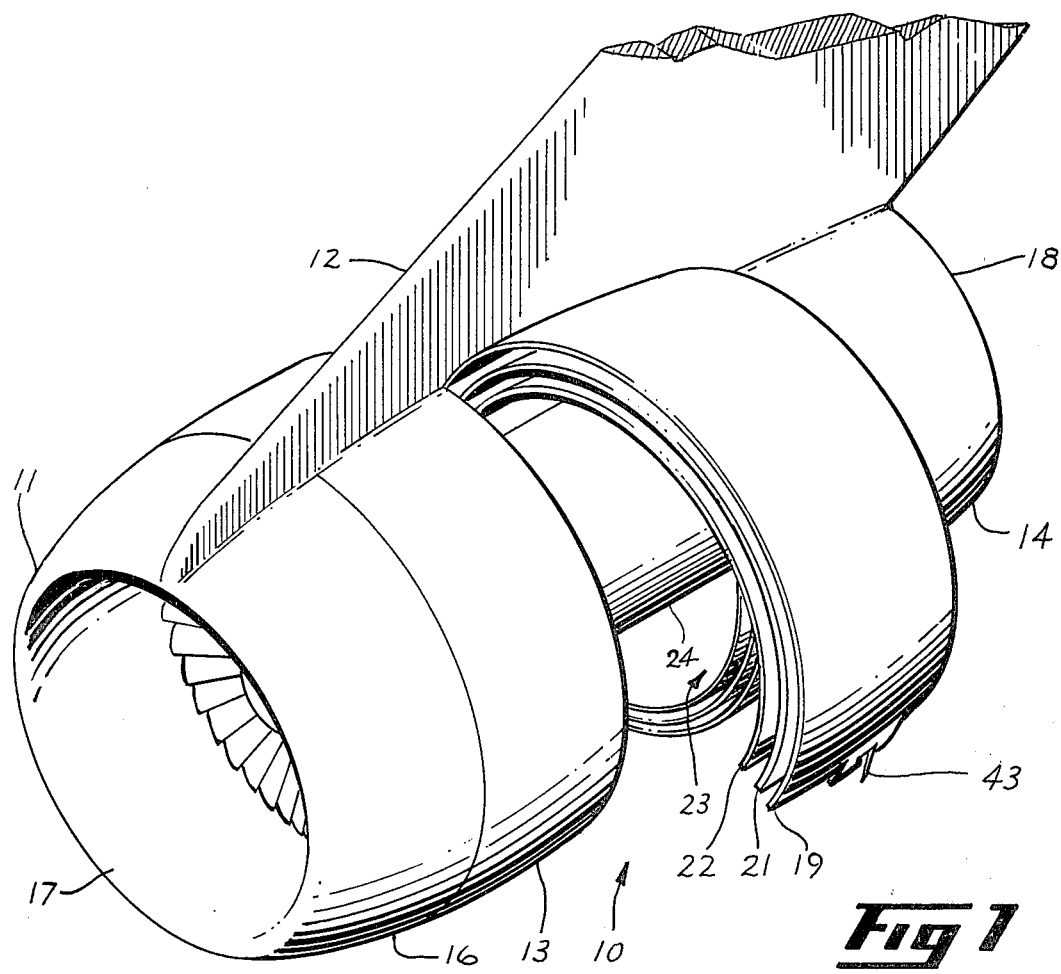
FIG. 1 is a perspective view of an installed aircraft engine having the present invention embodied therein.

Referring now to FIG. 1, the present invention is shown generally at 10 as installed in a turbofan engine 11 which is suspended from a pylon 12 of an aircraft. It will be seen that the inventive thrust reverser 10 is axially disposed between fixed forward and rear portions 13 and 14 of the engine outer cowl 16. The fixed forward portion 13 is associated with the engine fan frame and the fixed rear portion 14 is associated with the fixed engine exhaust nozzle. In normal rearward thrust-producing operation, the air enters the engine inlet 17 with part of it passing through the core and part of it flowing through the bypass duct. That portion passing into the core is mixed with fuel and burned in a combustor. It then passes through high and low pressure turbines and then is exhausted out the core nozzle. That portion which enters the bypass duct is first compressed by the fan and then flows within the long duct nacelle shown and is exhausted from the fan exhaust nozzle 18.

That portion of the invention 10 which can be seen in FIG. 1 includes an outer cowl translatable sleeve 19, a cascade structure 21, and the blocker doors 22, the three structures being concentrically disposed to define a portion of the outer flowpath of the bypass duct 23. The bypass duct is defined on its inner side by the inner cowl 24. As will be seen in FIGS. 1 and 2, the outer cowl translatable sleeve 19, the cascade structure 21, and the blocker doors 22 are all comprised of symmetrical circumferential halves with each half being hinged to the aircraft pylon 12 and latched to the other half along the bottom centerline so as to provide ready access to the engine. The inner cowl 24, in turn, has its own latch and hinge so as to provide access to the inner portion of the engine.

Figure 2:
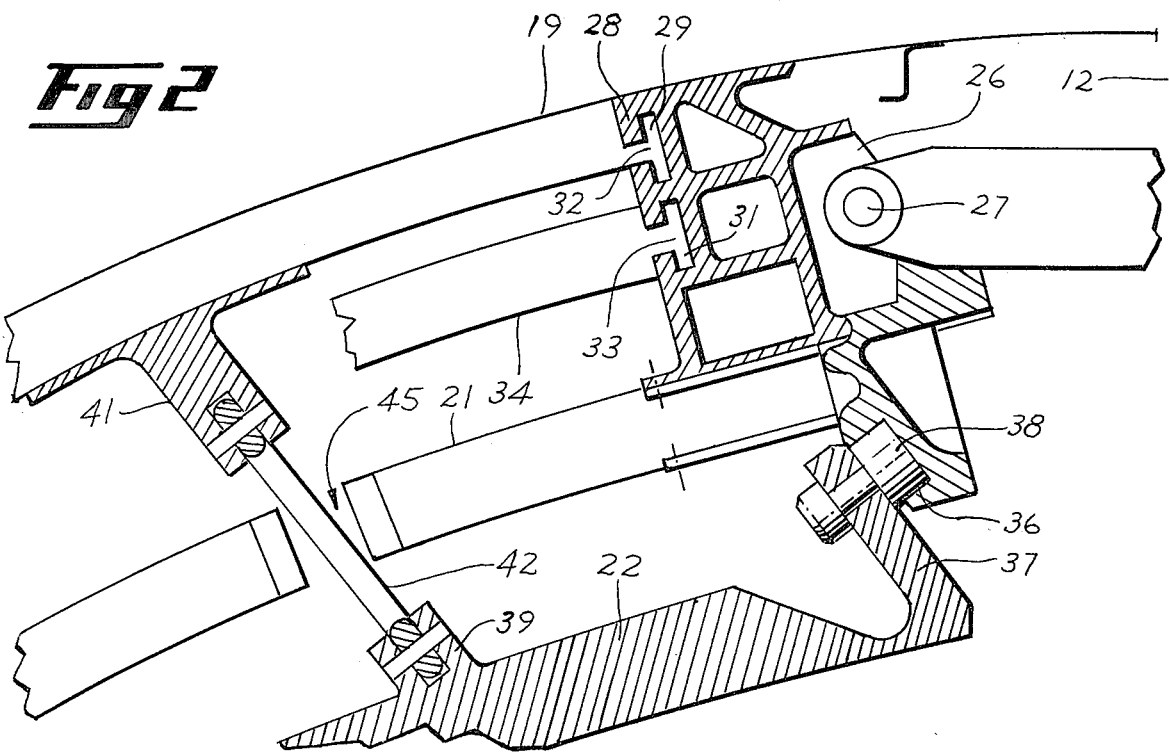
FIG. 2 is a partial sectional view of the hinged portion of the outer cowl.

Referring more specifically to FIG. 2, a hinge element 26 is pivotally attached by a pin 27 to the engine pylon 12. Connected, in turn, to the hinge element 26 is a hinge bracket 28 having axially extending grooves 29 and 31 formed therein for slidably receiving corresponding tongue portions 32 and 33 of the respective cowl translatable sleeve 19 and a unison ring 34 to be more fully described hereinafter. Also attached to the hinge bracket 28, in a rigid manner, is the cascade structure 21. Located concentrically inside the cascade structure 21 are the blocker doors 22 which are movably connected to a track 36 in the cascade structure 21 by way of an arm 37 and a roller 38 which fits rollably into the track 37 (see FIGS. 2 and 3). The blocker doors 22 are connected to the outer cowl translatable sleeve 19 by way of associated bosses 39 and 41 and the interconnecting blocker drive link 42 which extends through the cascade slot 45. Thus, the cowl translatable sleeve 19 and the unison ring 34 are adapted to translate axially within the hinge bracket 28, to which the cascade structure 21 is rigidly affixed, and the blocker doors 22 are adapted to move axially with respect to the fixed cascade structure 21 by way of the blocker drive link 42 when the cowl translatable sleeve 19 is moved by the actuator as will be described hereinafter. Further, to accommodate repair and maintenance of the engine, these elements are adapted to be rotated about the pivot pin 27 to expose the bottom portion of the inner cowl. The outer cowl is secured by a series of latch mechanisms 43, as shown in FIG. 1.

Figure 4:
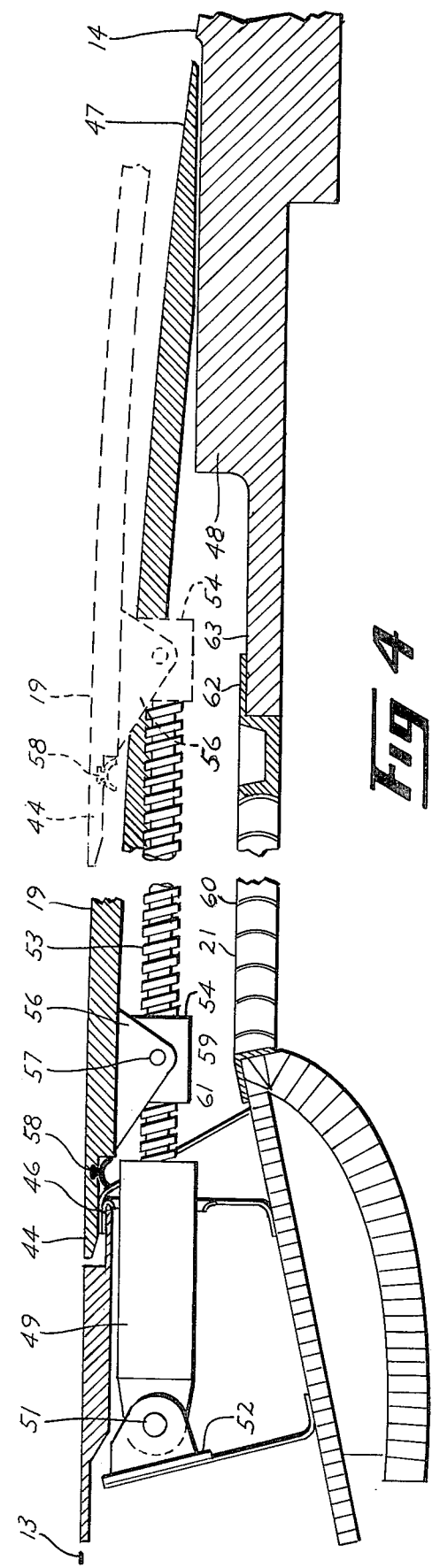
FIG. 4 is an axial cross-sectional view of the engine outer cowl with an actuator installed in accordance with the present invention.

Movement of the outer cowl sleeve 19 from its stowed to its thrust-reversing position is accomplished by the actuation system, as shown in FIG. 4. When in its stowed position, the cowl sleeve 19 forms a part of the continuous outer flowpath boundary with its forward end 44 resting on a shelf 46 at the rear end of the fan frame 13, and with its rear end 47 resting on a flat surface 48 of the fixed rear cowl portion 14. An actuator mechanism 49 is pivotally attached by a pin 51 to a bracket 52 in the rear part of the fan frame 13. The actuator 49, which may be driven by hydromechanical or pneumatic means, or the like, is connected to drive in a rotating manner a screw shaft 53 which extends rearwardly in generally parallel relationship to the cowl sleeve 19. Circumscribing and threadably engaging the screw shaft 53 is a screw follower 54 which is attached to the cowl sleeve 19 by way of a bracket 56 and fastening means 57. When the actuator 49 acts to move the screw follower 54 to the forward end of the screw shaft 53, as shown in FIG. 4, the cowl forward end 44 is in the stowed position, as shown by the solid lines. It will be seen that when in this position a rubber seal 58, which is disposed between the cowl forward end 44 and the shelf 46, acts to prevent the flow of air from the transmission area forward of the cowl sleeve 19. When a thrust-reversing function is desired, the actuator 49 is engaged to rotate the screw shaft 53 which, in turn, causes the screw follower 54 to move rearwardly and to translate the cowl sleeve 19 with it to the position as shown by the dotted lines in FIG. 4.

Figure 3:
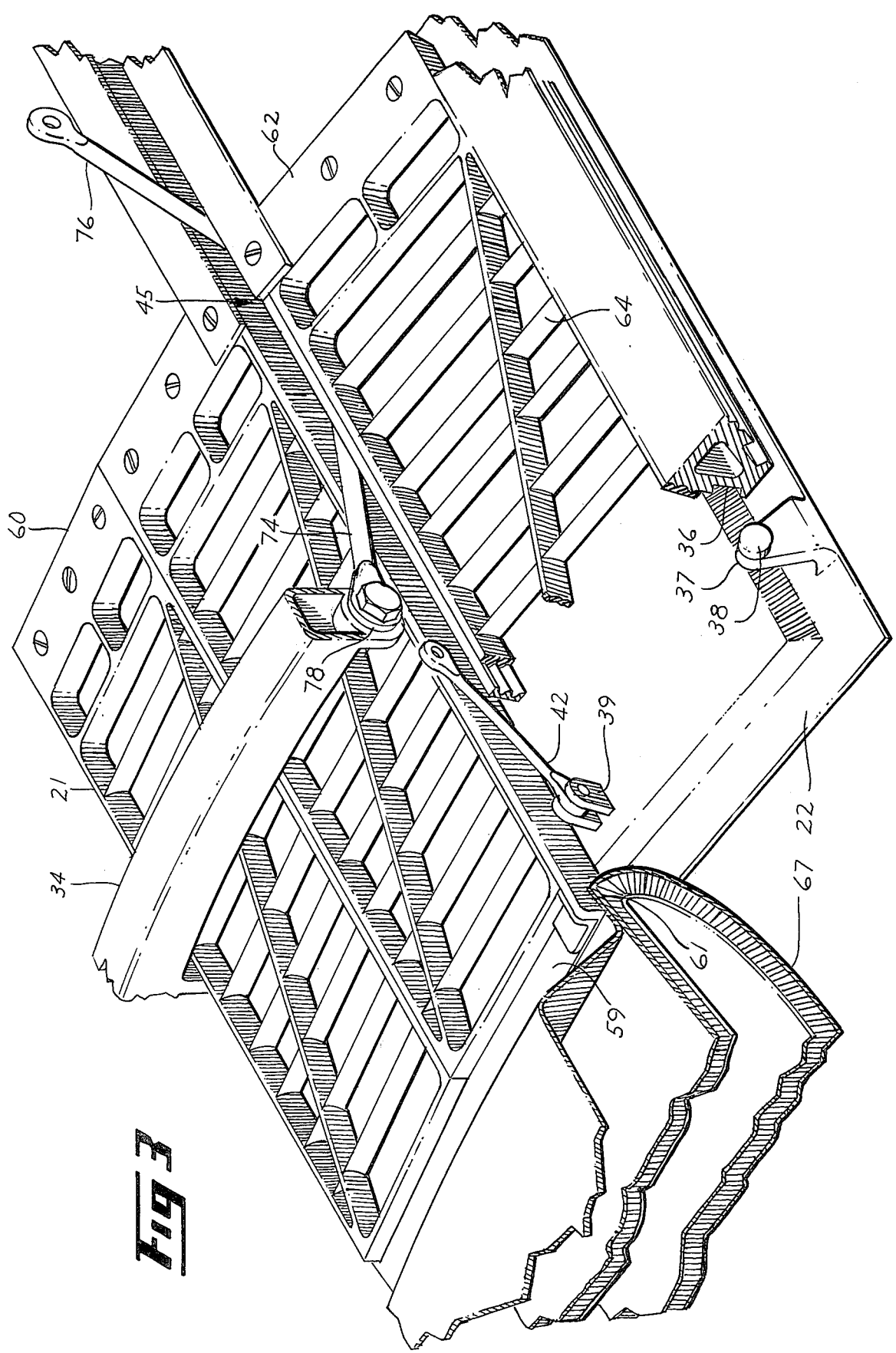
FIG. 3 is a perspective view of the cascade and related portions of the invention.

Located in close proximity to the cowl sleeve 19 is the cascade structure 21 comprising a number of sections 60, as shown in FIG. 3, disposed in a circumferential arrangement to form a cylinder. The cascade sections 60, shown in FIG. 3, are rigidly attached at their forward ends 59 to a shelf 61 on the rear end of the fan frame 13 and at their rearward ends 62 to a forwardly extending portion 63 of the fixed rear cowl portion 14. The purpose of the cascades is to turn in a forward direction the air which is deflected by the blocker doors in order to assist in the thrust-reversing function. This deflection of the air is accomplished by a plurality of vanes 64, shown in FIG. 3.

Figure 5:
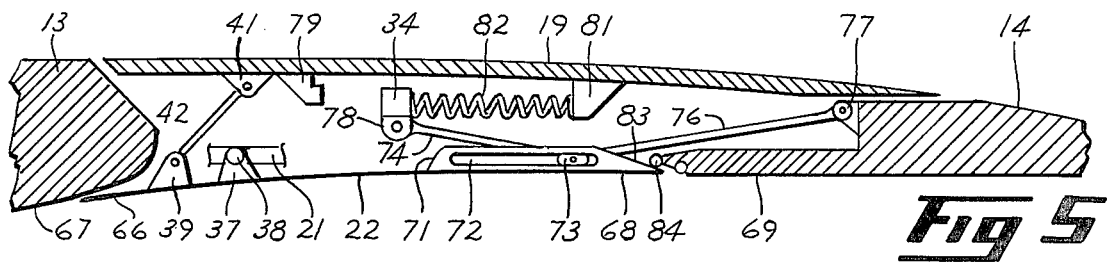
FIG. 5 is an axial sectional view of the present invention with the reverser in the stowed position.
Figure 6:
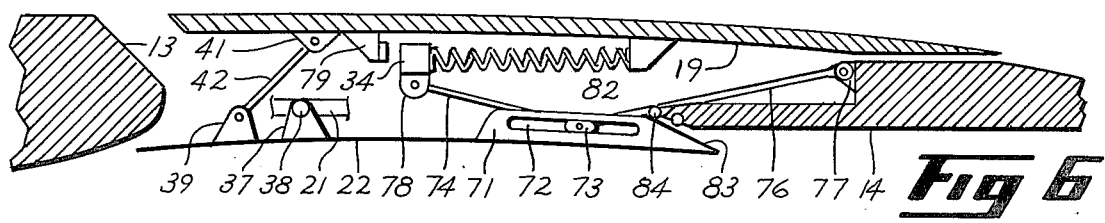
FIG. 6 is an axial cross-sectional view of the present invention with the reverser in the partially deployed position.
Figure 7:
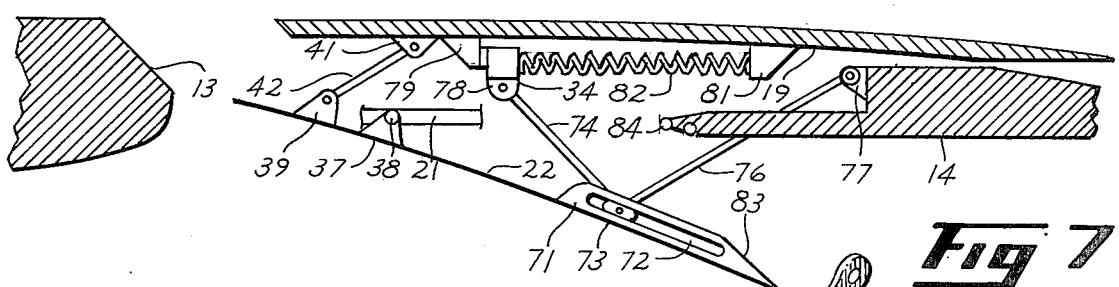
FIG. 7 is an axial cross-sectional view of the present invention with the reverser in a more fully deployed position.
Figure 8:
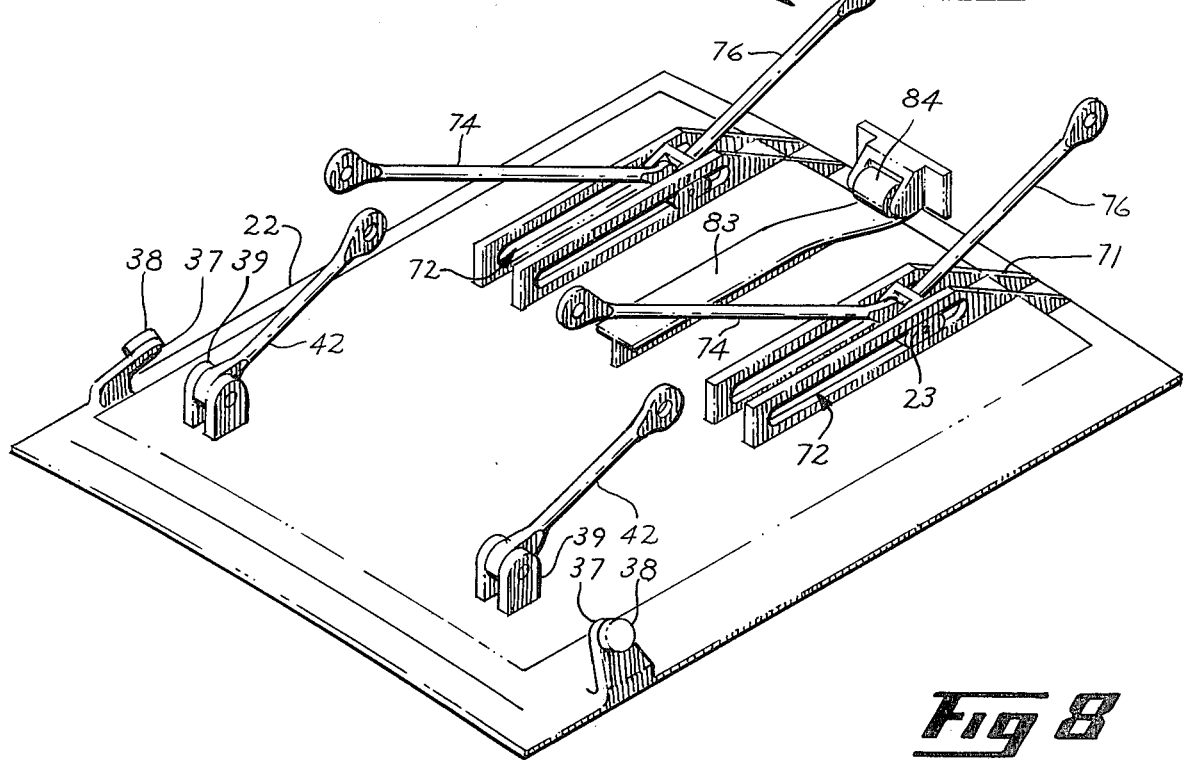
FIG. 8 is a perspective view of the blocker door and related linkage portions of the present invention.

Referring now to FIGS. 5, 6, and 7, the outer cowl sleeve 19 is shown in its stowed position, in its partially deployed position, and in a more fully deployed position. Also shown, are the blocker doors 22 and the associated linkage mechanism as their positions are varied to accommodate those three conditions. In the stowed position, the blocker doors 22 engage at their forward ends 66, a curved portion 67 of the fan frame 13, and at their rearward end 68, a flat section 69 of the cowl rear portion 14 to form a substantially continuous outer bypass duct flowpath boundary. As mentioned hereinbefore, the forward portion of the blocker doors 22 is secured to the cowl sleeve 19 by the blocker drive link 42 and to the cascade 21 by the roller 38. In order to ensure symmetrical and balanced operation, each of the blocker doors has two of such connections to each of the cowl sleeve 19 and the cascade 21, and at the rear end of the blocker doors 22, there is a similar symmetrical arrangement. A flange or track element 71 is attached to the outer side of the blocker doors 22 and has a slot 72 formed therein (also see FIG. 8). Movably disposed in the slot 72 is a slider shoe 73 which has pivotally connected thereto a forwardly extending slider drive link 74 and a rearwardly extending slider drag link 76. The drag link 76 passes through the cascade slot 45 and is pivotally attached to a boss 77 which is rigidly attached to the cowl rear portion 14. The slider drive link 74 also passes through the cascade slot 45 and is attached by a boss 78 to the unison ring 34, which is slidably attached to the hinge bracket 28 as described hereinabove and which acts to open the blocker doors 22 when moved rearwardly as is caused when the cowl sleeve 19 is translated rearwardly. The unison ring 34 is located axially between a unison ring bumper 79 and a biasing block 81 attached to and extending radially inward from the cowl sleeve 19. A spring 82 is interconnected between the unison ring 34 and the abutting portion of the sleeve on the biasing block 81 to bias the unison ring 34 forwardly.

When the cowl sleeve 19 and the blocker doors 22 are in the stowed position, as shown in FIG. 5, the unison ring bumper 79 is axially spaced from the unison ring 34, and the unison ring 34 is biased forwardly by the spring 82 to hold the blocker door 22 in its closed position. At the rear end of the blocker door 22 there is an attached ramp 83 whose outer surface is engaged by a roller 84 attached to the cowl rear portion 14. This ramp arrangement can be more clearly seen by reference to FIG. 8. As the cowl sleeve 19 is translated rearwardly by operation of the actuator 49, as described hereinabove, the link 42 starts to open the forward portion of the blocker doors 22, while at the same time the spring 82, acting through the unison ring 34 and the slider drive link 74, acts to bias the rearward portion thereof toward the closed position. This condition is shown in FIG. 6. When the cowl sleeve 19 has translated to the position shown in FIG. 7, the unison ring bumper 79 has engaged the unison ring 34 and acts to further open the blocker doors by way of the drive link 74. It will be seen that during movement of the blocker doors through the positions shown in FIGS. 5 through FIG. 7, the slider shoe 73 will move from a rearward position to a forward position within the slot 72. Further translation of the cowl sleeve 19 from the position shown in FIG. 7 will cause furher rotation of the blocker doors to a position where it substantially blocks off all of the bypass flow and forces it through the cascades and finally, through the open space vacated by the cowl sleeve 19. In order to again stow the reverser apparatus, the process as described hereinabove would be reversed.

There is thus provided a reverser system which is stowed entirely between two fixed portions of the outer cowl, and which is moved from the stowed to a deployed position without the use of linkage members extending through the bypass duct. Although the invention has been described in considerable detail, it will be recognized that the basic concept embodied therein can be accomplished by various other embodiments. What is desired to be secured by Letters Patent is distinctly claimed and particularly pointed out in the claims appearing below.

What is claimed is:

1. An improved fan engine thrust reverser of the type having a nacelle outer cowl, a translatable cowl sleeve, a fixed cascade, and a fan duct blocker door wherein the improvement comprises:
   (a) means for movably positioning the cowl sleeve and the blocker door in their stowed positions between two axially spaced fixed cowl sections;
   (b) linkage means located entirely within the nacelle outer cowl for moving the cowl sleeve and the blocker door from their stowed positions to their thrust-reversing positions; and
   (c) said positioning and linkage means includes a drive link having a pair of opposing ends, one of the opposing ends being coupled to the blocker door, means attached to and translatable with the cowl sleeve for exerting a rearward force on said drive link, said rearward force exerting means including a unison ring attached to the other end of said drive link and engageable by a bumper extending from the cowl sleeve.

2. An improved fan engine thrust reverser as set forth in claim 1 wherein said positioning and linkage means include a blocker drive link hingedly interconnecting the translating cowl sleeve and the blocker door proximate their forward ends.

3. An improved fan engine thrust reverser as set forth in claim 2 wherein said blocker drive link is hingedly attached at its opposite ends to each of two pivots rigidly attached to the cowl sleeve and the blocker door, respectively.

4. An improved fan engine thrust reverser as set forth in claim 1 wherein said positioning and linkage means include a drag link interconnecting the blocker door with the more rearward of said two axially spaced fixed cowl sections.

5. An improved fan engine thrust reverser as set forth in claim 4 wherein said drag link is hingedly attached at one end to a pivot which is rigidly attached to said rearward fixed cowl section.

6. An improved fan engine thrust reverser as set forth in claim 4 wherein said drag link is hingedly and slidably attached at an opposing end to a track element rigidly attached to the blocker door.

7. An improved fan engine thrust reverser as set forth in claim 6 wherein said track element includes a slot for slidably receiving a shoe pivotally attached to said drag link opposing end.

8. An improved fan engine thrust reverser as set forth in claim 1 wherein said positioning and linkage means include relatively translatable blocker door and cascade interconnected portions.

9. An improved fan engine thrust reverser as set forth in claim 8 wherein said interconnected portions comprise a roller element attached to said blocker door and rollably engaged in a track disposed in the cascade.

10. An improved fan engine thrust reverser as set forth in claim 1 wherein said drive link is rotatably connected to the blocker door.

11. An improved fan engine thrust reverser as set forth in claim 1 wherein said drive link is rotatably and translatably connected to the blocker door.

12. An improved fan engine thrust reverser as set forth in claim 11 wherein said drive link includes a slider shoe on one end thereof and said blocker door includes a slot for slidably and rotatably receiving said slider shoe therein.

13. An improved fan engine thrust reverser as set forth in claim 1 and including means for biasing said unison ring forwardly.

14. An improved fan engine thrust reverser as set forth in claim 13 wherein said biasing means comprises a spring disposed between said unison ring and an abutting portion of said translatable cowl sleeve.

15. An improved fan engine thrust reverser as set forth in claim 1 wherein said bumper does not engage said unison ring when the translatable cowl sleeve is in its stowed position.

16. An improved fan engine thrust reverser as set forth in claim 1 and including an engine pylon and wherein said unison ring is slidably attached to said engine pylon.

17. An improved fan engine thrust reverser as set forth in claim 1 wherein said positioning and linkage means includes an engine pylon and means for slidably connecting the translatable cowl sleeve to said pylon.

18. An improved fan engine thrust reverser as set forth in claim 1 wherein said positioning and linkage means include an actuator for selectively moving said cowl sleeve rearwardly from its stowed position to its open position.

* * * * *